UNITED STATES PATENT OFFICE.

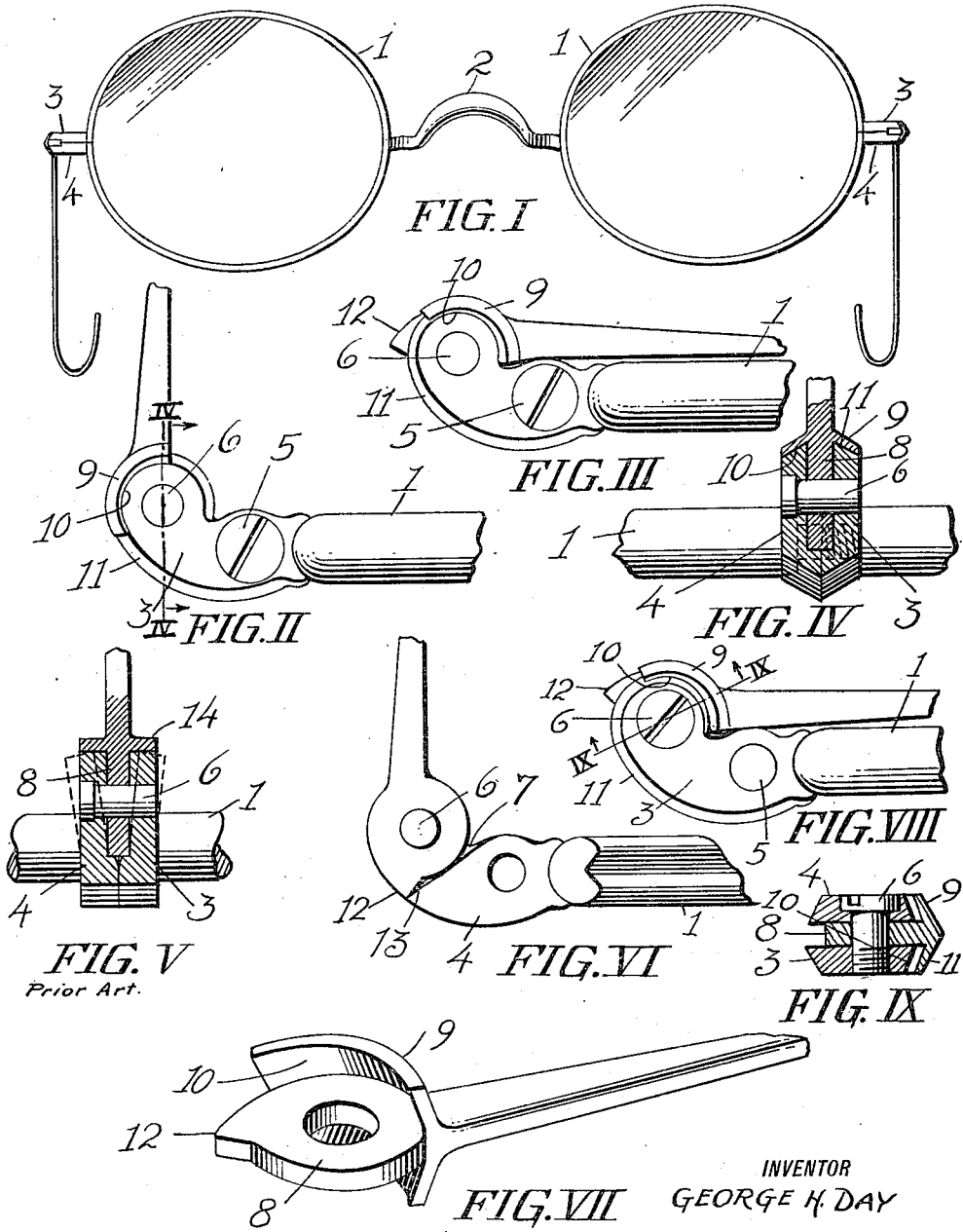

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

1,271,859.     Specification of Letters Patent.     Patented July 9, 1918.

Application filed February 5, 1917. Serial No. 146,701.

*To all whom it may concern:*

Be it known that I, GEORGE H. DAY, a citizen of the United States, residing at Southbridge, in the county of Worcester and State of Massachusetts, have invented certain new and useful Improvements in Opthalmic Mountings, of which the following is a specification.

My invention relates to improvements in opthalmic mountings and has particular reference to spectacle or like frame construction.

One of the leading objects of the present invention is the provision of a novel and improved form of temple construction adapted for use in connection with spectacle mountings, which shall provide an extremely rigid, durable and ornamental temple.

A further object of the present invention is the provision of a structure of this nature which may be employed to transform an ordinary end piece into a box temple type end piece and at the same time increase the efficiency and desirability of the construction.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a mounting constructed in accordance with and embodying my construction.

Fig. II represents an enlarged fragmentary view of the end piece temple butt.

Fig. III represents a similar view of the parts in closed or folded position.

Fig. IV represents a sectional view as on the line IV—IV of Fig. II.

Fig. V represents a similar sectional view of a prior art construction.

Fig. VI represents a view of my end piece equipped with an ordinary temple.

Fig. VII represents a fragmentary perspective view of my improvement.

Fig. VIII represents a fragmentary plan view of a slightly modified construction.

Fig. IX is a transverse sectional view taken on the line IX—IX of Fig. VIII.

In the drawings, in which similar characters of reference are employed to denote corresponding parts throughout the several views, the numeral 1 designates the usual eye wires or rims connected as by the bridge 2 at the inner side and bearing on the outer side the pair of end piece halves or sections 3 and 4 united and held together and thus joining the ends of the rim as through the medium of the screw 5 and having secured therein a dowel 6 for pivotal attachment of the temple, the temple swinging in the cut away portions or recesses 7 of the end piece.

The principal features of my present improvement can best be understood by reference to Figs. IV, V and VII, particular attention being called to the construction shown in Fig. IV, from which it will be seen that my improved temple comprises the pivot ear or flattened portion 8 and the beveled box member 9 integral therewith provided with the beveled outer face and with the undercut or correspondingly beveled inner faces 10, adapted to have a tight fit against the outer beveled faces 11 of the end piece ears 3 and 4. In addition my improved construction, as is best shown in Fig. VII, is provided with the projecting lug or stop portion 12 adapted to contact with the end wall 13 which forms the limit for the pocket or cut away portion 7 on the end pieces receiving the temple to thus limit the opening movement of the temple.

I am aware that prior to my invention structures of the box type or what is commonly termed box temple, have been employed on the market. These structures, however, as shown in the prior art view Fig. V, have merely comprised the pivot engaging ear 8 and the plain or straight box 14, while the end piece itself has in these instances been provided with a shoulder against which the box 14 itself strikes to limit the opening movement of the temple.

This makes a much less attractive and desirable construction from a standpoint of appearance than does my improved construction, and in addition is open to the disadvantage indicated for example in the dotted lines, Fig. V, from which it will be seen that after the temple has been used awhile the ears will have a tendency to bend apart or separate, thus allowing the temple to become quite loose, and involving the objection known as falling temples, that is, the temples both allowing the frame to tilt and at the same time being so loose that they will have no tendency to stay in open position but will tend to drop inward toward the lenses or fold, making it more difficult to keep them open when placing the mounting on the face or temporarily laying the same down.

This is one of the great advantages attained by my present construction, in that by the interlocking of the inner faces 10 of my temple with the outer beveled faces 11 of the end pieces the end pieces are absolutely locked and held against any spreading movement and upon any tendency of same to spread they will frictionally engage the inner faces of the temple box and thus render the construction even tighter than when they are in their original position, and in this way compensate for any possible wear between the parts.

An additional advantage present in my construction to which I wish to call attention is the fact that as illustrated in Fig. VI, I may if desired insert in my end piece in place of my improved box temple an ordinary or plain temple which will make a flush joint with the outer bevel edges of the strap, and will present a neat and attractive appearance, in this manner making it possible to use with the one end piece both my improved box type of temple and a plain or ordinary temple when the box type is not desired.

In Figs. VIII and IX, I have shown a slight modification of my invention, in which it will be noted that the pivot member 6 is slightly eccentrically disposed as respects the outer curvature of the end piece ears 3 and 4, and that when the temple is folded there is a space for clearance between the outer beveled edge of the end pieces and the inner beveled face of the box 9.

This construction serves a double advantage, in that in the assembling of the parts with the plain dowel or pivot, the ears may be more readily swung apart and away from the beveled locking faces of the wall or reassembled, than would be possible should the parts have a continuous tight fit, while in addition this looseness, when in folded position, is taken up as the temples are opened, until they tightly wedge against the outer walls and most securely interlock therewith and tighten up against the walls to securely hold the parts together in open position or when in use, while releasing the pressure and thus the tendency to spring open the box walls when the parts are folded.

From the foregoing description taken in connection with the accompanying drawings, the construction and advantages of my improved temple should be readily apparent, and it will be seen that I have provided a simple and efficient construction which is extremely ornamental and attractive in appearance, which attains all the advantages of the old type of box temple and overcomes the disadvantages of loosening of the parts and of the shouldered end piece by the use of a projecting stop on the temple for engagement with the interior of the slot so that the end piece itself may be a smooth and uninterrupted surface capable of more satisfactory construction from filled or like material and a smoother and more attractive appearance.

I claim:

1. The combination with an end piece having a beveled outer face and a temple receiving slot, of a temple having a portion pivotally secured within the slot and a box exterior to the slot overlying and interlocking with the beveled faces of the end piece, substantially as illustrated.

2. In an ophthalmic mounting, the combination with an end piece having a temple receiving slot, of a temple pivotally secured within the slot and means on the temple embracing the end piece to prevent spreading of the slotted portion thereof.

3. A spectacle temple, including a butt having a pivot ear and a stop lug projecting beyond the pivot ear and a box having inner beveled faces adapted to extend laterally of the pivot ear at each side but stopping short of the terminal portion of the lug specifically as illustrated.

4. In an ophthalmic mounting, the combination with a split end piece, of a temple having a portion pivotally secured within the end piece and means on the temple frictionally engaging the outer end of the end piece for resisting relative spreading movement of the parts.

5. The combination with an end piece having a beveled outer face and a temple receiving slot, of a temple having a portion pivotally secured within the slot and a box exterior to the slot provided with inner beveled faces adapted to interlock with the beveled faces of the end piece as and for the purpose set forth.

6. The combination with an end piece having a beveled outer face, of a temple pivotally secured thereto and having means embracing the beveled face to prevent spreading of the parts.

7. The combination with an end piece having a beveled outer face, of a temple pivotally secured to the end piece and having beveled faces adapted to interlock with the end piece substantially as and for the purpose set forth.

8. The combination with an end piece having a temple-receiving slot, of a temple having an ear pivotally secured in the slot, said ear being provided with a stop lug for engaging the wall of the slot to limit the pivotal movement of the temple, and being further provided with an exterior wall forming a box overlying the edges of the slot, the end of said wall forming a second stop in addition to the stop lug as and for the purpose set forth.

9. A spectacle temple having an ear provided with a stop lug and an exterior side wall formed on said ear providing a box as and for the purpose set forth.

10. The combination with an end piece having a temple-receiving slot, of a temple having an ear pivotally secured in the slot, said ear being provided with a stop lug for engaging the wall of the slot to limit the pivotal movement of the temple and being further provided with an exterior side wall forming a box overlying the edges of the slot.

In testimony whereof I affix my signature in the presence of two witnesses.

GEORGE H. DAY.

Witnesses:
EDITH M. HALVORSEN,
ESTHER M. LAFLER.

Copies of this patent may be obtained for five cents each, by addressing the "Commissioner of Patents, Washington, D. C."